US010527413B2

(12) United States Patent
Matsuo et al.

(10) Patent No.: US 10,527,413 B2
(45) Date of Patent: Jan. 7, 2020

(54) OUTSIDE RECOGNITION DEVICE

(71) Applicant: Hitachi, Ltd., Chiyoda-ku, Tokyo (JP)

(72) Inventors: Shigeru Matsuo, Tokyo (JP); Noriyasu Hasejima, Tokyo (JP); Kenichirou Kurata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 48 days.

(21) Appl. No.: 15/315,415

(22) PCT Filed: Jun. 25, 2014

(86) PCT No.: PCT/JP2014/066766
§ 371 (c)(1),
(2) Date: Dec. 1, 2016

(87) PCT Pub. No.: WO2015/198410
PCT Pub. Date: Dec. 30, 2015

(65) Prior Publication Data
US 2017/0146343 A1    May 25, 2017

(51) Int. Cl.
*G01C 3/06* (2006.01)
*H04N 7/18* (2006.01)
(Continued)

(52) U.S. Cl.
CPC ........... *G01C 3/06* (2013.01); *E02F 9/205* (2013.01); *E02F 9/24* (2013.01); *E02F 9/261* (2013.01);
(Continued)

(58) Field of Classification Search
None
See application file for complete search history.

(56) References Cited

U.S. PATENT DOCUMENTS

| | | | | |
|---|---|---|---|---|
| 2010/0150455 A1* | 6/2010 | Oyama | .................. | G01C 3/085 382/219 |
| 2010/0315505 A1* | 12/2010 | Michalke | ................ | G06T 7/251 348/118 |
| 2014/0244037 A1* | 8/2014 | Scott | ...................... | B25J 9/1694 700/253 |

FOREIGN PATENT DOCUMENTS

JP    2006-201030 A    8/2006
JP    2012-225111 A    11/2012
(Continued)

OTHER PUBLICATIONS

Szeliski, "Image Mosaicing for Tele-Reality Applications," IEEE Workshop on Application of Computer Vision, 1994.*
(Continued)

*Primary Examiner* — Christopher Braniff
(74) *Attorney, Agent, or Firm* — Crowell & Moring LLP

(57) ABSTRACT

An outside recognition device according to the present invention has an object to perform distance measurement of an obstacle detected with a surrounding monitoring camera at a low cost. The outside recognition device according to the present invention has a stereo camera that measures a distance in front of the vehicle, a surrounding monitoring camera that photographs a surrounding area of the vehicle, a three-dimensional measuring unit that measures a photographing range of the surrounding monitoring camera with the stereo camera by means for rotating the stereo camera, and generates three-dimensional information from the measurement result, a distance correction information generating unit that generates distance correction information corresponding to a photographing direction of surrounding monitoring camera from the three-dimensional information, and a distance measuring unit that measures a position of the obstacle detected with a surrounding monitoring camera.

8 Claims, 9 Drawing Sheets

(51) Int. Cl.
  *G01C 3/14*    (2006.01)
  *E02F 9/26*    (2006.01)
  *E02F 9/24*    (2006.01)
  *E02F 9/20*    (2006.01)
  *G06K 9/00*    (2006.01)
  *H04N 13/296*  (2018.01)
  *H04N 13/128*  (2018.01)
  *H04N 13/239*  (2018.01)
  *H04N 13/25*   (2018.01)
  *H04N 13/00*   (2018.01)
  *E02F 3/32*    (2006.01)

(52) U.S. Cl.
  CPC .......... *G01C 3/14* (2013.01); *G06K 9/00805* (2013.01); *H04N 7/181* (2013.01); *H04N 7/183* (2013.01); *H04N 13/128* (2018.05); *H04N 13/239* (2018.05); *H04N 13/296* (2018.05); *E02F 3/32* (2013.01); *E02F 9/26* (2013.01); *H04N 13/25* (2018.05); *H04N 2013/0081* (2013.01)

(56) References Cited

FOREIGN PATENT DOCUMENTS

| | | | |
|---|---|---|---|
| JP | 2013-204411 A | | 10/2013 |
| JP | 2013204411 | * | 10/2013 |
| JP | 2014-6577 A | | 1/2014 |

OTHER PUBLICATIONS

International Search Report (PCT/ISA/210) issued in PCT Application No. PCT/JP2014/066766 dated Aug. 12, 2014 with English-language translation (four (4) pages).

* cited by examiner

2810 PHOTOGRAPHED IMAGE

DISTANCE CORRECTION INFORMATION 2811

| LENGTH | WIDTH | X | Y | Z |
|---|---|---|---|---|
| A | 0 | x1 | y1 | z1 |
| A | 1 | x2 | y2 | z2 |
| A | 2 | x3 | y3 | z3 |
| | | ... | | |
| B | 0 | x4 | y4 | z4 |
| | | ... | | |

OUTSIDE RECOGNITION DEVICE

TECHNICAL FIELD

The present invention relates to an outside recognition device mountable on an industrial machine such as a hydraulic shovel or a crane.

BACKGROUND ART

As an industrial machine such as a hydraulic shovel or a crane, remote-controlled machine or machine for automatic operation is increasingly introduced. Such industrial machine is equipped with a stereo camera or a laser scanner as a three-dimensional measuring sensor. In many cases, such three-dimensional measurement sensor conducts photographing in a front direction from a driver's seat, and it is not possible to monitor obstacles over the entire circumference of the industrial machine.

On the other hand, to monitor the obstacles surrounding the industrial machine, a surrounding monitoring camera including plural cameras is increasingly introduced. In the surrounding monitoring camera, since plural combined monocular cameras are used, calculation of a distance from a detected obstacle is limited. Generally, for distance measurement with a monocular camera, there are limitations, for example, the size of the object should be already known, or distance information on the photographed ground should be already known. To eliminate these limitations, sensors to measure a distance from an object or ground in a photographing range of the monocular camera may be provided. In a distance measuring method disclosed in [Patent Literature 1], in addition to the surrounding monitoring camera, a distance image sensor based on TOF (Time of Flight) method or the like is provided for distance measurement.

CITATION LIST

Patent Literature

Patent Literature 1: Japanese Unexamined Patent Application Publication No. Hei25 (2013)-204411

SUMMARY OF INVENTION

Technical Problem

According to the [Patent Literature 1], it is necessary to provide a sensor for distance measurement in a photographing direction of the surrounding monitoring camera in addition to the surrounding monitoring camera. There is a problem of cost increase.

Solution to Problem

To solve the above problem, there is provided a structure having a stereo camera 210 that measures a distance in front of the vehicle, a surrounding monitoring camera 230 that photographs a surrounding area of the vehicle, a three-dimensional measuring unit 215 that measures a photographing range of the surrounding monitoring camera with the stereo camera 210 by means 15 for rotating the stereo camera 210, and generates three-dimensional information from the measurement result, a distance correction information generating unit 220 that generates distance correction information corresponding to a photographing direction of surrounding monitoring camera from the three-dimensional information, and a distance measuring unit 218 that measures a position of the obstacle detected with a surrounding monitoring camera.

To attain the above object, an outside recognition device according to the present invention includes: distance measuring means for measuring a distance in front of a vehicle; a surrounding monitoring camera that photographs a surrounding area of the vehicle; a three-dimensional measuring unit that measures a photographing range of the surrounding monitoring camera with the distance measuring means and generates three-dimensional information; a distance correction information generating unit that generates distance correction information corresponding to a photographing direction of the surrounding monitoring camera from the three-dimensional information; and a distance measuring unit that measures a position of an obstacle detected with the surrounding monitoring camera using the distance correction information.

Further, according to the present invention, in the outside recognition device, the distance measuring means is a stereo camera device.

Further, according to the present invention, in the outside recognition device, the three-dimensional measuring unit rotates the distance measuring means with an upper rotating body of the vehicle when the photographing range of the surrounding monitoring camera is measured with the distance measuring means.

Further, according to the present invention, in the outside recognition device, the stereo camera is provided with a rotating mechanism, and the three-dimensional measuring unit rotates the stereo camera with the rotating mechanism when the photographing range of the surrounding monitoring camera is photographed with the stereo camera.

Further, according to the present invention, in the outside recognition device, the distance measuring means is a laser scanner device.

Advantageous Effects of Invention

According to the present invention, since the distance information of the surrounding monitoring camera is generated with the stereo camera to recognize an object in front of the vehicle, it is possible to omit a distance sensor for the surrounding monitoring camera and attain cost reduction.

DESCRIPTION OF EMBODIMENTS

Hereinbelow, embodiments of the present invention will be described with reference to the drawings.

Figure 1:
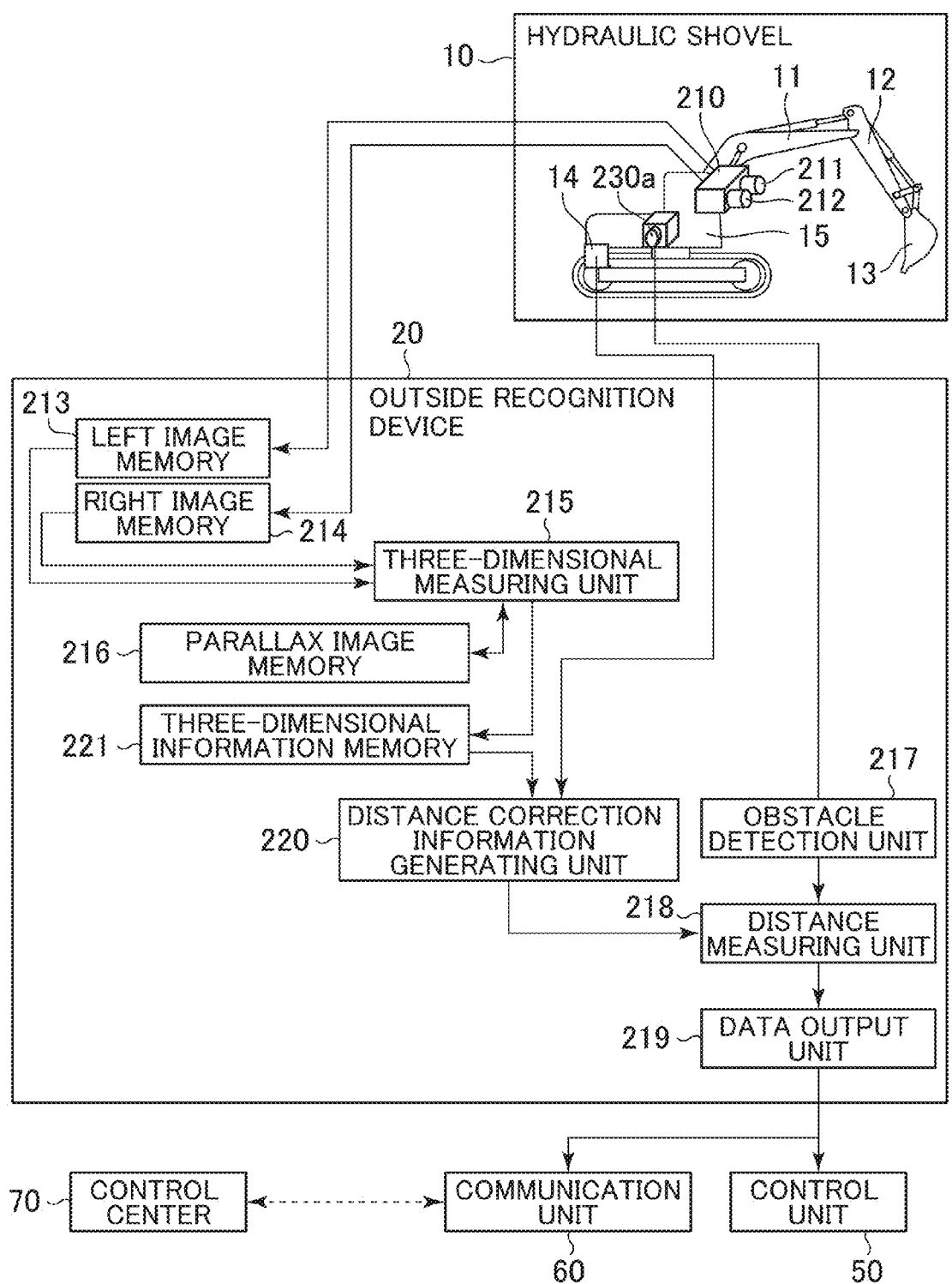
FIG. 1 is an embodiment showing a hydraulic shovel to conduct automatic excavation and a configuration of an outside recognition device mounted on the hydraulic shovel according to the present invention.

FIG. 1 shows a hydraulic shovel 10 as an industrial machine to implement the present invention. The hydraulic shovel 10 is remove-controlled from a control center 70, or it has an automatic excavation function. The automatic excavation function automatically recognizes an excavation object, then excavates the excavation object, and drops soil in predetermined space. The hydraulic shovel 10 has an outside recognition device 20 to recognize the surrounding area of the shovel, and excavates an excavation objected recognized with the outside recognition device 20. The vehicle 10 has a bucket 13 for excavation, an arm 12 to vertically move the bucket 13 and a boom 11. Further, the shovel rotates an upper rotating body 15 to horizontally move the bucket. Further, the shovel has an upper rotating body angle sensor 14 to obtain a rotation angle of the upper rotating body 15 with this sensor.

The outside recognition device 20 is connected to a stereo camera device 210 and surrounding monitoring cameras 230a, 230b, and 230c, and monitors the entire circumference of the hydraulic shovel 10.

Figure 2:
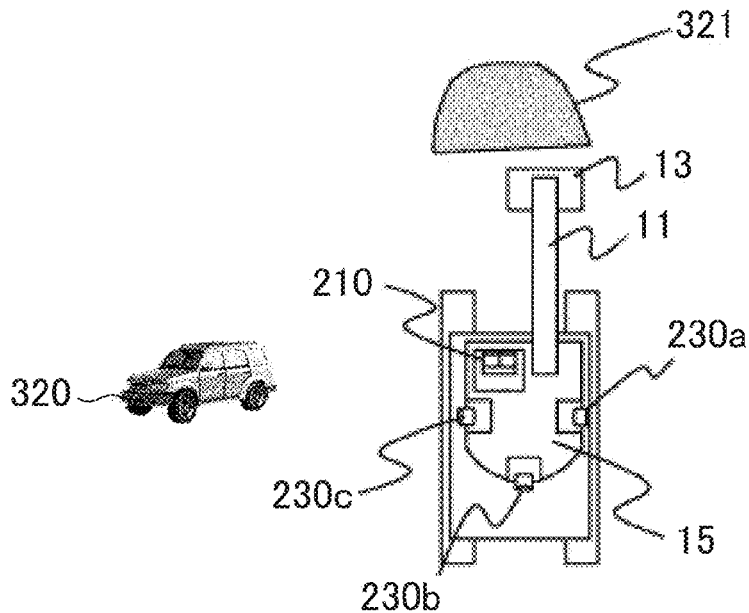
FIG. 2 shows attachment positions between a stereo camera and surrounding monitoring cameras.

FIG. 2 shows attachment positions between the stereo camera 210 and the surrounding monitoring cameras 230a, 230b and 230c. The stereo camera 210 photographs the direction of the bucket 13, and measures the positions of the bucket 13 and the excavation object 321. The surrounding monitoring camera 230a monitors the right side of the vehicle body; the surrounding monitoring camera 230b, the rear side of the vehicle body; and the surrounding monitoring camera 230c, the left side of the vehicle body. Thus it is possible to monitor the entire circumference of the hydraulic shovel 10 not photographed with the stereo camera device 210. Since the surrounding monitoring cameras are respectively a monocular camera, generally, when a cubic object such as the obstacle 320 is detected, the distance between the solid body and the hydraulic shovel 10 is estimated based on the position on a photographed image. For the distance estimation, it is necessary to previously measure the positional relationship between the position on the image and the hydraulic shovel 10. It is necessary to perform the measurement of positional relationship each time the height at which the hydraulic shovel 10 and the solid body exist is changed. That is, when the hydraulic shovel 10 is provided on the excavation object 321, the positional relationship is measured each time the arrangement is changed.

In the embodiment shown in FIG. 1, it is possible to easily measure the positional relationship without any distance measuring means for the surrounding monitoring camera, by measuring the positional relationship with the stereo camera device 210. The outside recognition device 20 in FIG. 1 has a function of measuring the outside with the stereo camera device 210 and a function of measuring the outside with the surrounding monitoring cameras 230a, 230b and 230c.

The stereo camera device 210 measures the distance from a subject utilizing the parallax between images photographed with the left image photographing unit 211 and the right image photographing unit 212. The images photographed with the stereo camera device 210 are temporarily stored in the left image memory 213 and the right image memory 214, and are sent to a three-dimensional measuring unit 215. The three-dimensional measuring unit 215 generates a parallax image from the left and right images, stores the parallax image into the parallax image memory 220, obtains three-dimensional coordinates of the subject, and stores the three-dimensional coordinates into a three-dimensional information memory 221. The three-dimensional coordinates are converted with the distance correction information generating unit 220 to distance correction information of the surrounding monitoring camera. The distance correction information is a table in which the positional relationship between each of mesh-divided images of photographed images from the surrounding monitoring cameras 230a, 230b and 230c and the hydraulic shovel 10 is recorded.

The images from the surrounding monitoring cameras 230a, 230b and 230c are sent to the obstacle detection unit 217, and used for detection of the obstacle 320 or the like. As a detection method, a general detection method for a monocular camera such as template matching is used. Next, the distance measuring unit 218 calculates the distance and positional relationship between the detected object and the hydraulic shovel 10 using the distance correction information. The result of calculation is notified to the control unit 50 to control the operations of the arm 12, the bucket 13 and the upper rotating body 15, and to the control center 70 through the communication unit 60 by wireless communication.

Figure 3:
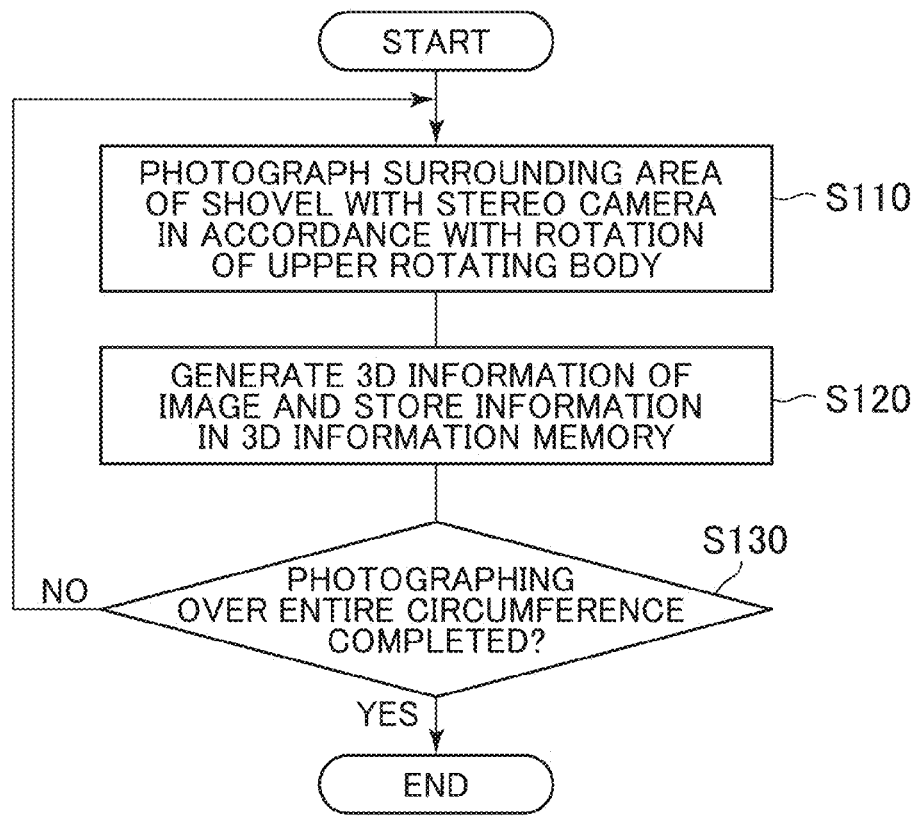
FIG. 3 shows an operation flow to generate three-dimensional information over an entire circumference.
Figures 6A, 6B:
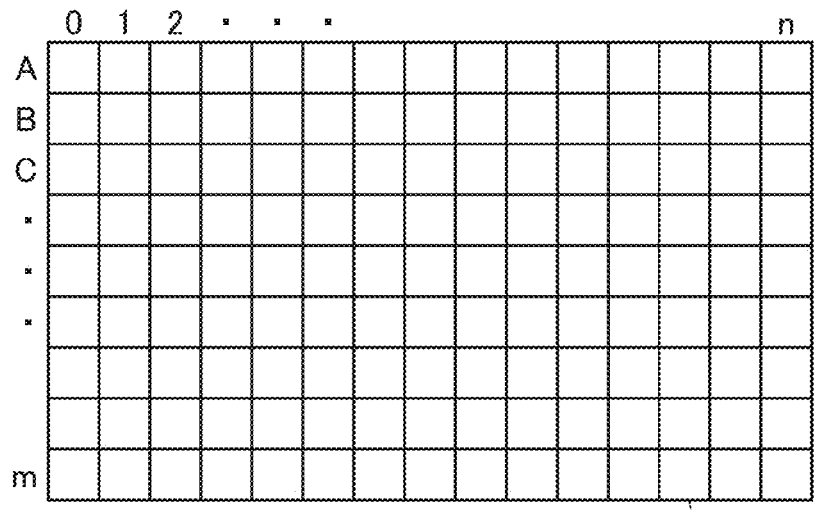
FIGS. 6A and 6B are explanatory diagrams of distance correction information.

FIG. 3 shows an operation flow upon generation of three-dimensional information over the entire circumference. First, the upper rotating body 15 is rotated and the entire circumference of the hydraulic shovel 10 is photographed with the stereo camera 210 (step 110, hereinbelow, S110). Three-dimensional information for 1 picture of the photographed image is generated, and the information is stored, along with rotation angle of the stereo camera at that time, into the three-dimensional information memory 221. As the three-dimensional information for 1 picture, e.g., mesh-images as shown in FIG. 6 are previously generated. In the case of unmanned hydraulic shovel, the rotation operation of the upper rotating body 15 at this time is automatically made with the control unit 50. In the case of manned hydraulic shovel, the upper rotating body may be manually rotated (S120). This operation is performed upon each rotation of the stereo camera 210 at a predetermined angle until the measurement over the entire circumference is completed (S130).

Figure 4:
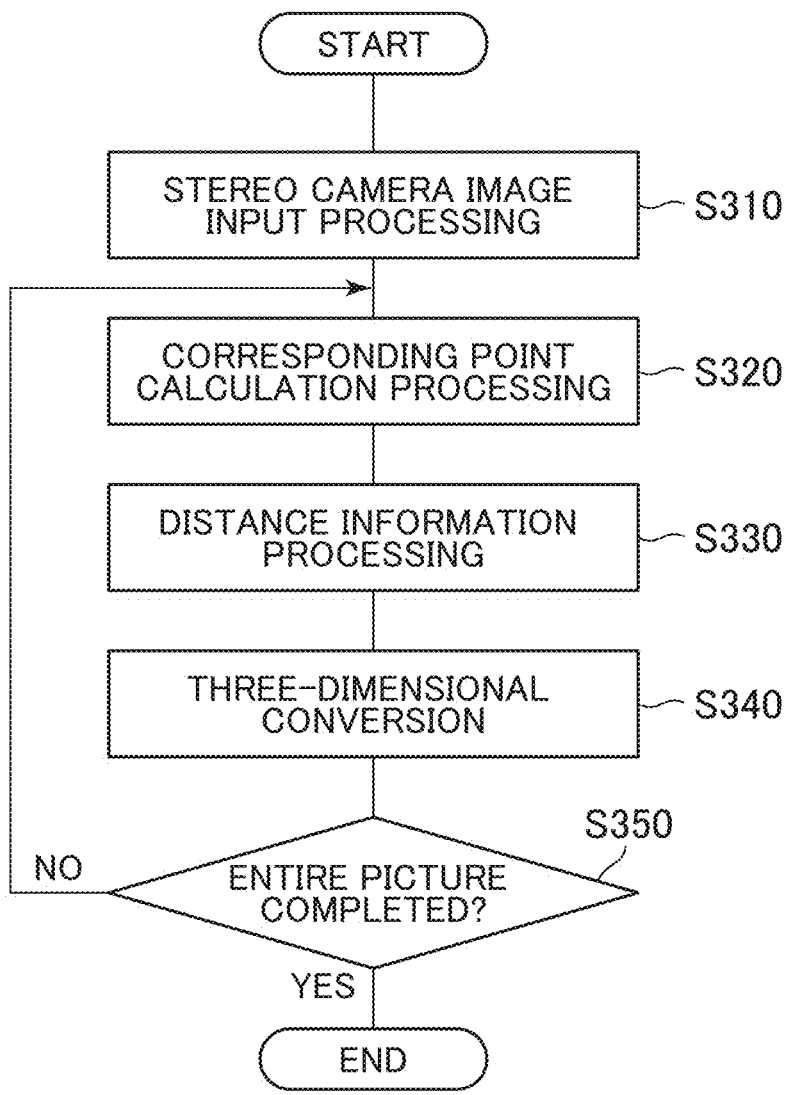
FIG. 4 shows a flow of three-dimensional information generation processing.
Figure 5:
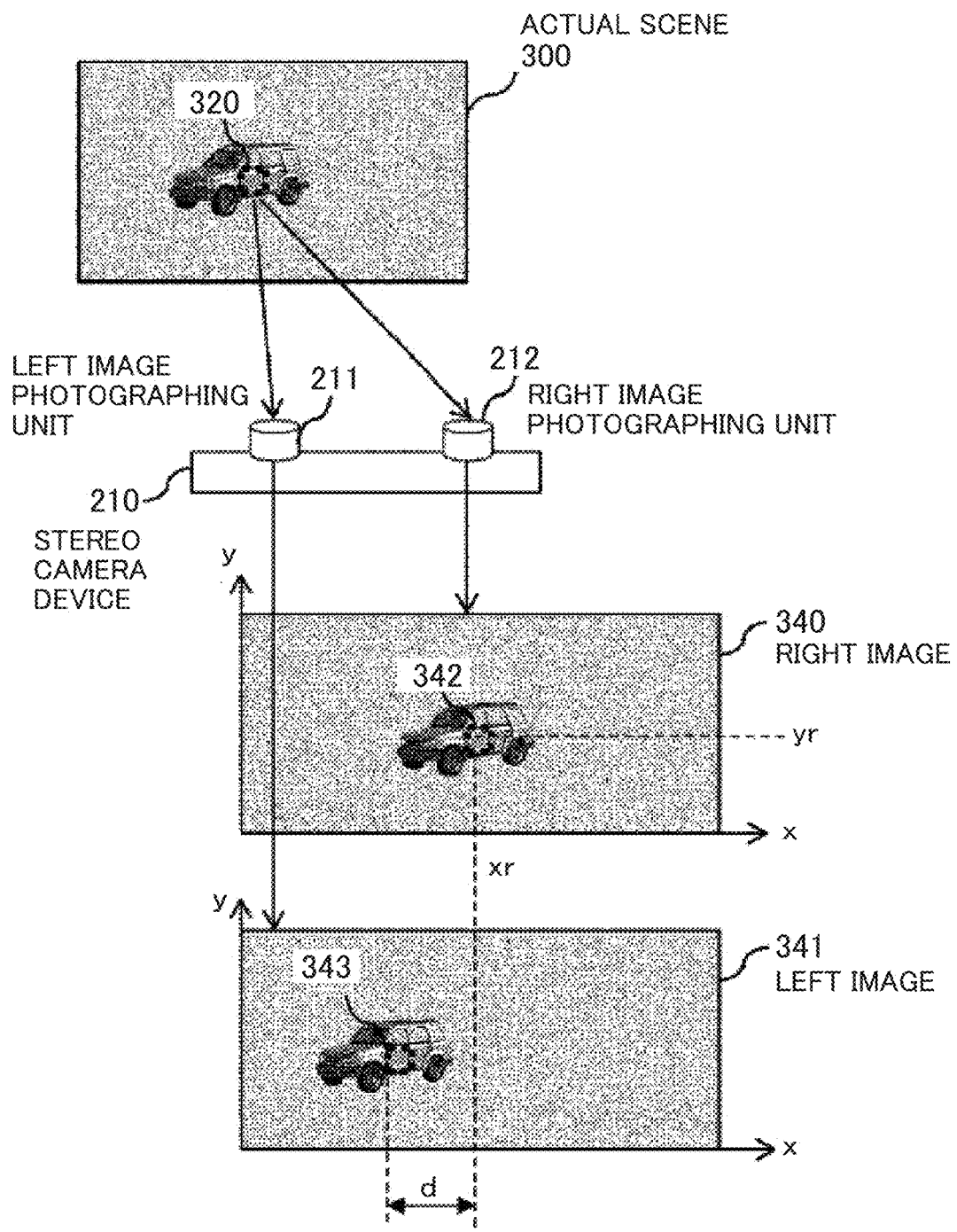
FIG. 5 shows a principle of parallax data generation.

FIG. 4 shows a flow of three-dimensional information generation processing. First, as stereo camera image input processing, a right image photographing unit 212 and a left image photographing unit 211 of the stereo camera device 210 start image photographing. The photographed images are temporarily stored in the right image memory 214 and the left image memory 213 (S310). Based on these image data, parallax data is generated with the three-dimensional measuring unit 215 (S320). FIG. 5 shows a principle of parallax data generation. When a right image 340 obtained by photographing actual scene 300 with the right image photographing unit 212 and a left image 341 obtained by photographing the actual scene 300 with the left image photographing unit 211 exist, a point 320 in the actual scene 300 is photographed in the position of a point 342 in the right image 340, while in the position of a point 343 in the left image 341. As a result, parallax d occurred between the points 342 and 343. The value of the parallax close to the stereo camera device 210 is high while away from the stereo camera device is low. The parallax in the entire image is obtained in the entire picture and the result is stored into the parallax image memory 220. It is possible to measure the distance by the principle of triangulation using the parallax (S330). The distance Z is obtained from the parallax d with the following expression.

$$Z=(f \times B)/d$$

Note that f is a focal distance from the right and left photographing units; and B, the distance between the right image photographing unit 212 and the left image photographing unit 211. Further, the three-dimensional X and Y positions in a point where the distance Z is obtained are obtained from the following expression (S340).

$$X=(Z \times xr)/f, \quad Y=(Z \times yr)/f$$

Note that xr is an x-coordinate on the right image 340; and yr, a y-coordinate on the right image 340. The processing is performed until the entire circumference of the hydraulic shovel 10 is measured (S350). As described above, it is possible to obtain the position (X, Y and Z) of the subject on the three-dimensional space with the image photographed with the stereo camera device 210.

FIG. 6 is an explanatory diagram of distance correction information 2811. The distance correction information generating unit 220 divides the three-dimensional information of the three-dimensional information memory 221 the photographing range of the photographed image 2810 from one surrounding monitoring camera (e.g. 230a) in mesh, and holds three-dimensional information corresponding to the respective meshes, as a table. This table is the distance correction information 2811. With this table, e.g., regarding a mesh position A2, coordinates (x3, y3, z3) are obtained. The coordinates are based on a coordinate system with the hydraulic shovel 10 as an origin. The coordinates positioned between meshes are calculated by linear interpolation on adjacent mesh coordinates.

Figure 7:
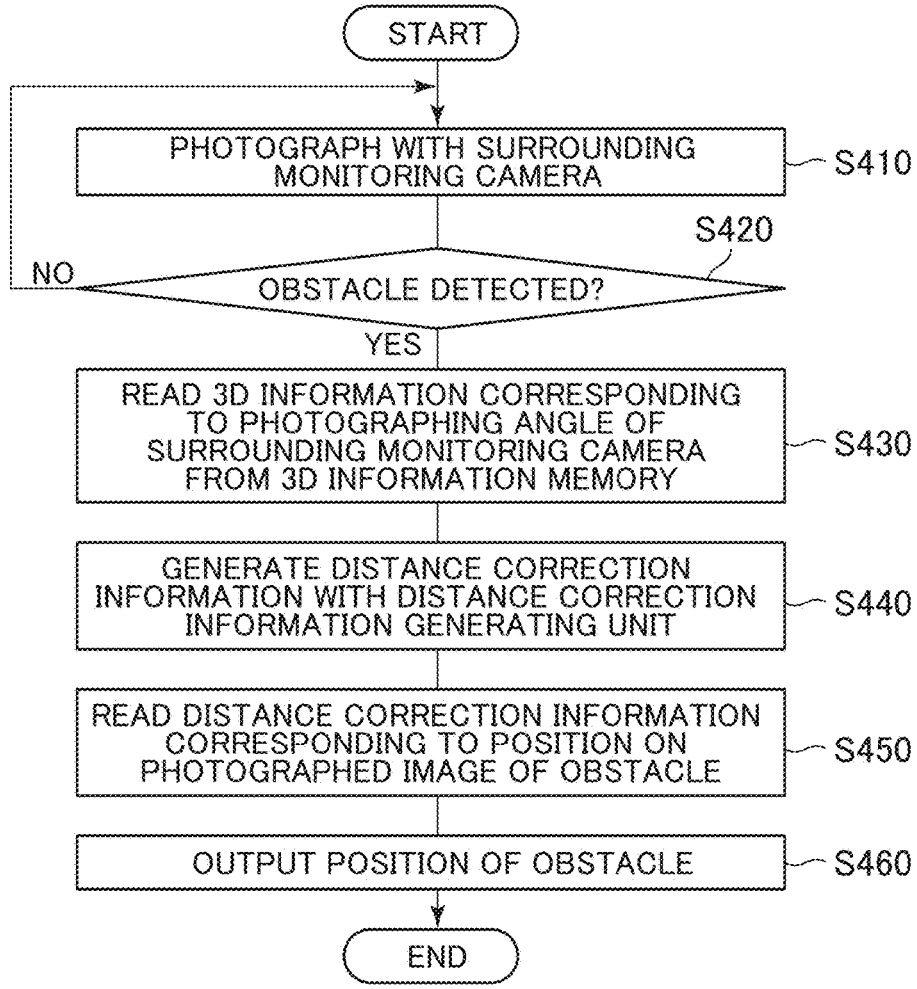
FIG. 7 is a processing flow to calculate the position of an obstacle detected with the surrounding monitoring camera.

FIG. 7 is a processing flow to calculate the position of an obstacle detected with the surrounding monitoring camera. The circumference of the hydraulic shovel 10 is photographed with the surrounding monitoring camera (S410), and the obstacle detection unit 217 determines whether or not an obstacle has been detected in the image (S420). As the obstacle detection method, a general method such as template matching may be used. When an obstacle has been detected, three-dimensional information corresponding to a photographing angle of the surrounding monitoring camera is read from the three-dimensional memory 221 (S430). The read three-dimensional information is converted with the distance correction information generating unit 220 into the distance correction information 2811 (S440). Next, the position of the detected obstacle on the photographed image is determined, and the distance measuring unit 218 reads data of the distance correction information 2811 corresponding to the position on the image (S450). A data output unit 219 outputs the position and the distance of the obstacle read in this manner to the control unit 50 and the like (S460).

Figure 8:
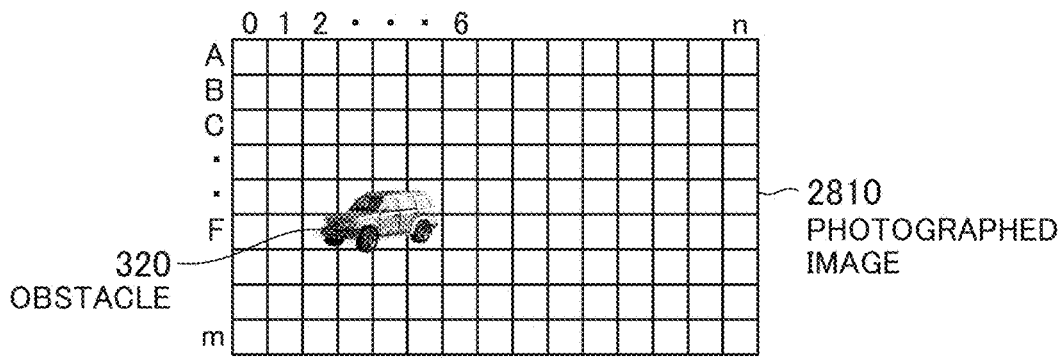
FIG. 8 is an embodiment where a mesh position of the obstacle is selected from a photographed image obtained with the surrounding monitoring camera.
Figure 9:
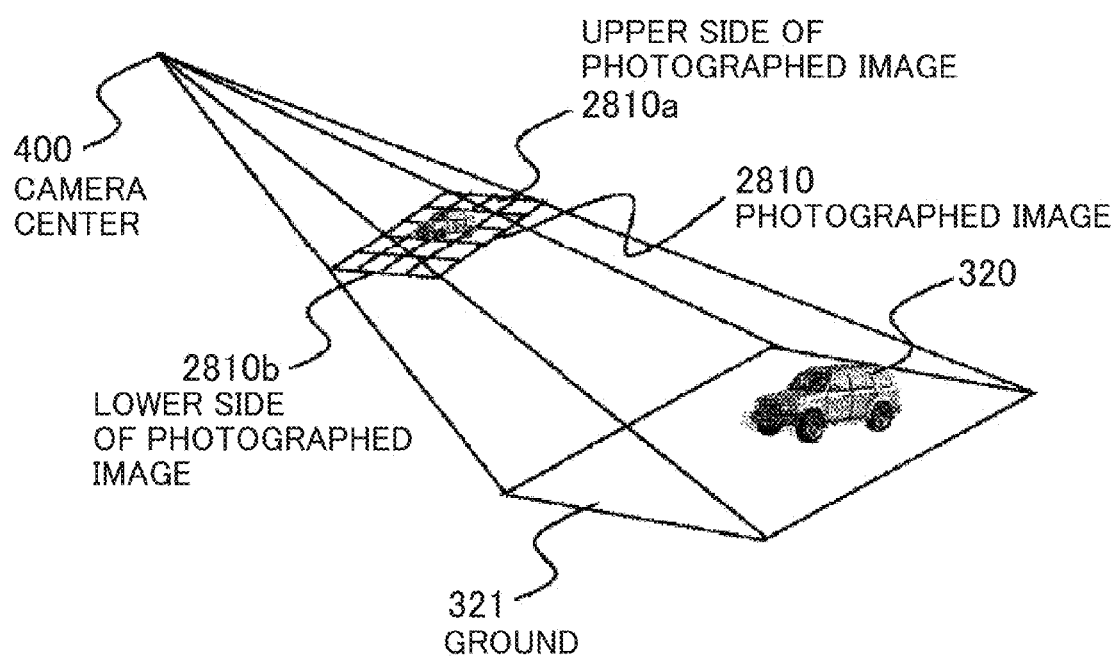
FIG. 9 shows relationship between the distance correction information and the ground.

FIG. 8 shows an example where a mesh position of the obstacle 320 is selected from the photographed image 2810 obtained with the surrounding monitoring camera. As in the case of this figure, the obstacle 320 is photographed over plural meshes. In this case, as a position to read the data of the distance correction information 2811, the lowest data of the related meshes is read. As shown in FIG. 9, the distance correction information 2811 is distance information on the premise of travelling on flat ground 321. The surrounding monitoring camera performs photographing such that apart in the ground 321 close to the hydraulic shovel 10 is in a lower position in the image 2810 while a part away from the shovel is in an upper position in the image 2810. Since a camera center 400 is the position of the hydraulic shovel 10, a lower part of the photographed image of the obstacle 320 is the position closest to the hydraulic shovel 10.

According to the above-described embodiment, the stereo camera 210 generates the distance correction information 2811 using the surrounding monitoring cameras 230a, 230b and 230c before the hydraulic shovel 10 starts operation. Since distance measuring means for the surrounding monitoring camera is not required, it is possible to estimate the distance and position of an obstacle at a low cost.

Figure 10:
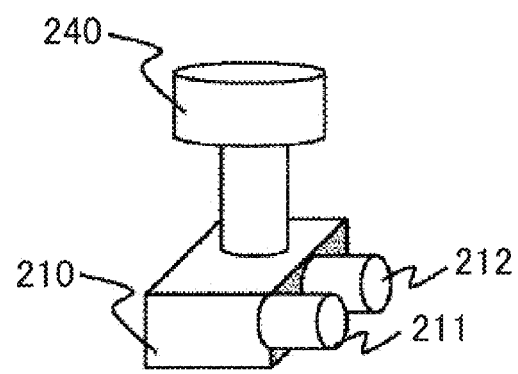
FIG. 10 shows an example where the stereo camera is provided with a rotating mechanism.

FIG. 10 shows an example where the stereo camera 210 is provided with a rotating mechanism 240. In the processing flow to generate the distance correction information in FIG. 3, it is necessary to rotate the stereo camera 210 at S110. In FIG. 3, the rotation operation of the upper rotating body 15 is utilized for this purpose. However, it is impossible to rotate the upper rotating body 15 depending on work situation. In preparation for such case, the stereo camera 210 may be provided with the rotating mechanism 240. With the rotating mechanism 240, it is possible to rotate the stereo camera 210 without rotating the upper rotating body 15.

Figure 11:
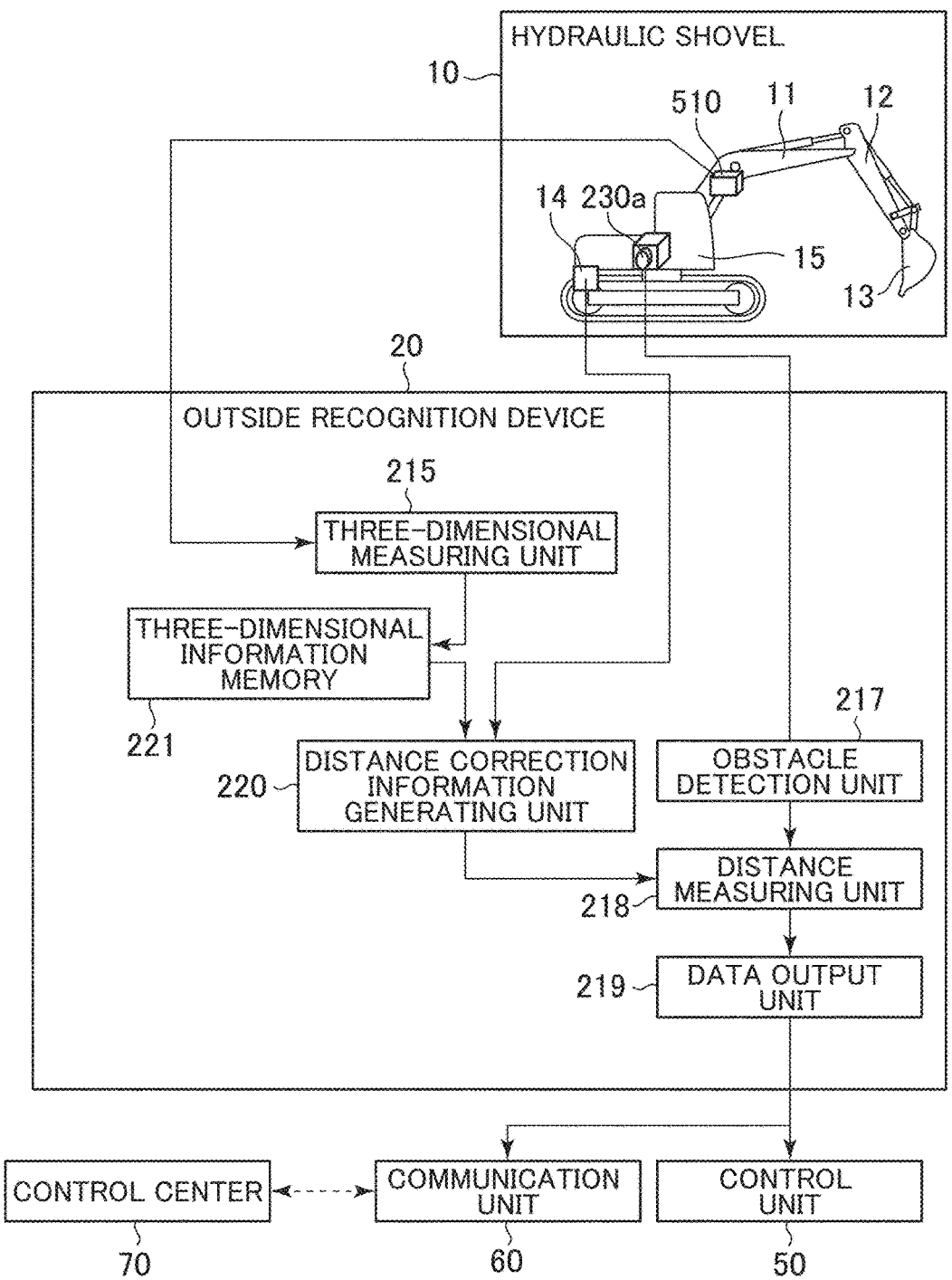
FIG. 11 shows an example where a laser scanner is provided.

Next, FIG. 11 shows an embodiment where a laser scanner 510 is provided in place of the stereo camera device 210. Unless specifically noted, the same reference numerals as those in the aforementioned embodiment denote the same constituent elements and effects. Since the laser scanner 510 scans a laser light beam in the vertical direction, it is possible to generate three-dimensional information of the surrounding area of the hydraulic shovel 10 by rotating the upper rotating body 15. Since the three-dimensional information is a coordinate with the hydraulic shovel 10 as an origin, it is possible to obtain the same three-dimensional information as that obtained by using the stereo camera device 210.

Figure 12:
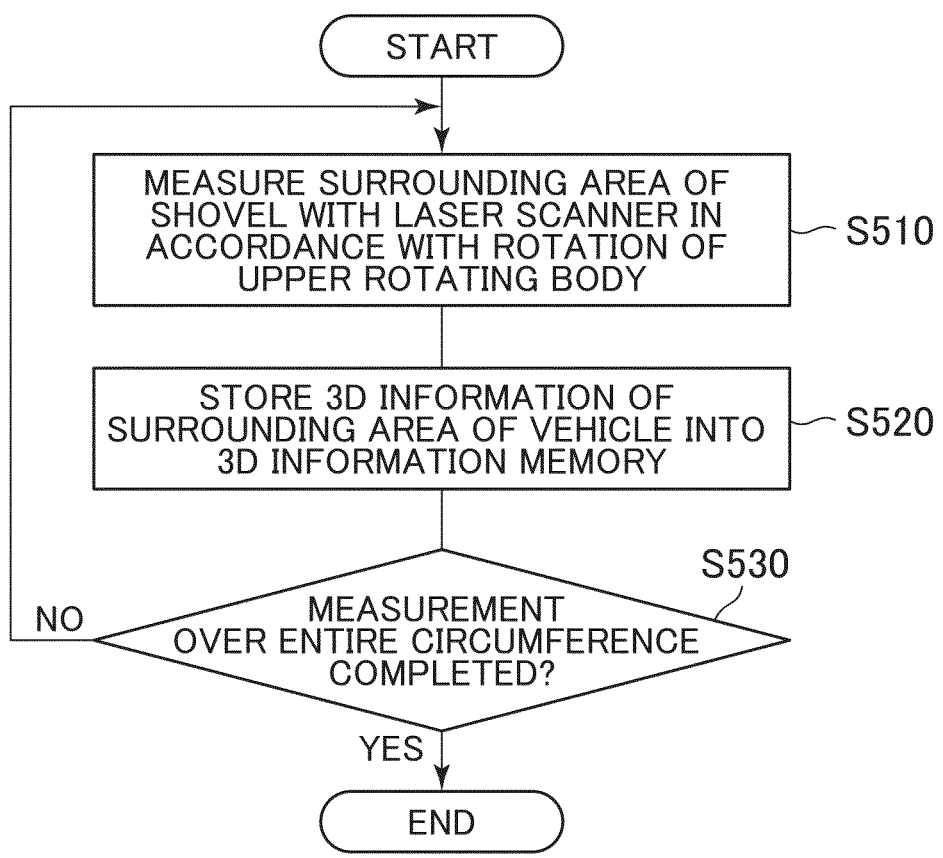
FIG. 12 shows an operation flow to generate three-dimensional information over the entire circumference when the laser scanner is provided.

FIG. 12 shows a processing flow to generate three-dimensional information of the entire circumference when the laser scanner 510 is used. The surrounding area of the hydraulic shovel 10 is measured with the laser scanner 510 in accordance with the rotation of the upper rotating body 15 (S510). Next, the measured three-dimensional information is stored, along with angle data of the upper rotating body angle sensor 14, into the three-dimensional information memory 221 (S520). The series of processing is performed until the entire circumference of the hydraulic shovel 10 is measured (S530). The method of measuring the position and distance of the obstacle detected with the surrounding monitoring camera thereafter is the same processing as that in the case of the above-described stereo camera device 210.

The invention claimed is:

1. An outside recognition device comprising:
 distance measuring means for measuring a distance in front of a vehicle;
 a surrounding monitoring camera that photographs a surrounding area of the vehicle;
 a three-dimensional measuring unit that measures a photographing range of the surrounding monitoring camera with the distance measuring means and generates three-dimensional information;
 the photographing range of the surrounding monitoring camera is wider than the photographing range of the three-dimensional measuring unit;
 a distance correction information generating unit that generates distance correction information corresponding to a photographing angle of the surrounding monitoring camera from the three-dimensional information; and a distance measuring unit that measures a position of an obstacle detected with the surrounding monitoring camera using the distance correction information, wherein the distance measuring means first measures a distance from the surrounding area of the vehicle by the rotation of the distance measuring means.

2. The outside recognition device according to claim 1, wherein the distance measuring means is a stereo camera.

3. The outside recognition device according to claim 1, wherein the three-dimensional measuring unit rotates the distance measuring means with an upper rotating body of the vehicle when the photographing range of the surrounding monitoring camera is measured with the distance measuring means.

4. The outside recognition device according to claim 2, wherein the stereo camera is provided with the rotating mechanism that rotates the distance measuring means without rotating an upper body of the vehicle, and wherein the three-dimensional measuring unit rotates the stereo camera with the rotating mechanism when the photographing range of the surrounding monitoring camera is photographed with the stereo camera.

5. The outside recognition device according to claim 1, wherein the distance measuring means is a laser scanner device.

6. The outside recognition device according to claim 1, wherein the distance measuring means first measures the distance from the entire circumference of the vehicle by the rotation of the distance measuring means.

7. The outside recognition device according to claim 1, wherein the three-dimensional measuring unit generates a parallax image from left and right images obtained from the distance measuring means, stores the parallax image in a parallax image memory, and obtains three-dimensional coordinates of a subject in front of the vehicle.

8. The outside recognition device according to claim 1, wherein the surrounding monitoring camera is configured to operate without a distance sensor.

* * * * *